United States Patent [19]
Piper et al.

[11] Patent Number: 5,920,739
[45] Date of Patent: Jul. 6, 1999

[54] SHUTTER MECHANISM WITH INTEGRAL BLADE, SPRING, AND TRIGGER

[75] Inventors: John Denis Douglas Piper, London; Michael John Hanscombe, Stevanage; Edward Charles Timothy Samuel Glover, London, all of United Kingdom

[73] Assignee: Eastman Kodak Company, Rochester, N.Y.

[21] Appl. No.: 08/894,196

[22] PCT Filed: Dec. 2, 1996

[86] PCT No.: PCT/EP96/05323

§ 371 Date: Oct. 6, 1997

§ 102(e) Date: Oct. 6, 1997

[87] PCT Pub. No.: WO97/21142

PCT Pub. Date: Jun. 12, 1997

[30] Foreign Application Priority Data

Dec. 5, 1995 [GB] United Kingdom .................. 9524823

[51] Int. Cl.⁶ .................................................. G03B 9/36
[52] U.S. Cl. ................................................... 396/483
[58] Field of Search .................................. 396/483, 493, 396/495, 502

[56] References Cited

U.S. PATENT DOCUMENTS 3,650,194  3/1972  Ib .
5,016,033  5/1991  Chan ........................................ 396/401
5,043,751  8/1991  Rice .

FOREIGN PATENT DOCUMENTS 485 951  11/1948  Belgium .

*Primary Examiner*—Howard B. Blankenship
*Attorney, Agent, or Firm*—Robert Luke Walker

[57] ABSTRACT

Described herein is a shutter mechanism (10) suitable for use in a single-use camera. The mechanism (10) comprises a mounting plate (12, 120) and a shutter member (14, 140) mounted thereon. Shutter member (14, 140) comprises a spring (141) connected to a shutter blade/trigger member (142) by means of arm portions (143, 144), the connection between the spring (141) and the shutter blade/trigger member (142) to the arm portions (143, 144) being effected by hinges (145, 146, 147, 148). The mounting plate (12, 120) comprises a circular disc (120) having recess portions (121, 126) in which spring (141) and shutter blade/trigger member (142) are respectively located. Depression of shutter blade/trigger member (142) moves it to a metastable position against the action of the spring (141), and once through that position, the action of the spring (141) accelerates the shutter blade/trigger member (142) over the lens (not shown) to provide an exposure for photographic material mounted within the camera.

21 Claims, 4 Drawing Sheets

SHUTTER MECHANISM WITH INTEGRAL BLADE, SPRING, AND TRIGGER

FIELD OF THE INVENTION

The present invention relates to improvements in or relating to shutter mechanisms, and is more particularly, although not exclusively, concerned with shutter mechanisms for single-use cameras (SUCs).

BACKGROUND OF THE INVENTION

It is well known that photographic exposure of a photographic material is achieved by the combined effect of image intensity and the time this energy is allowed to act on the photographic material. Accurate control of the duration for which energy is allowed to act on the photographic material is therefore important. Shutter mechanisms are used to effect this control.

Shutter mechanisms can be categorised in accordance with their positioning within the camera, for example, front shutters, 'between-lens' shutters and focal plane shutters. Most modern cameras employ a type of 'between-lens' shutter.

In its simplest form, the 'between-lens' shutter is a sector shutter comprising a circular metal plate with an elongated aperture. The metal plate is positioned perpendicular to the light path and makes one rotation when operated. Speed is controlled by a simple spring which is usually tensioned by a part of a release lever. Sector shutters are inexpensive and are often fitted to cheap cameras where inconsistencies which develop over a period of time and the limited speed range are not important.

The most commonly used type of photographic shutter is the bladed or diaphragm shutter. This type of shutter comprises three to five thin metal blades which open and shut across the light path. The blades are designed to minimise the time taken for opening and closing during the exposure cycle. Each shutter blade is pivoted at its outer edge and linked to a ring which is rotated to open the blades. Power for this rotation comes from a main driving spring which is tensioned prior to the shutter being activated. Diaphragm shutters are compact and offer a wide range of speeds.

Problem to be Solved by the Invention

The shutters described above are complicated and comprise many components which need to be accurately moved so that light is uniformly incident on the photographic material within the camera.

Moreover, such shutter mechanisms are expensive to manufacture and assemble, and they take up a substantial amount of space within a camera. This is particular a problem in single-use cameras where a single film or frame is to be exposed, and the size of the camera is to be minimised. The components of such cameras are recycled/re-used where appropriate.

SUMMARY OF THE INVENTION

It is therefore an object of the present invention to provide a shutter mechanism which is simple both to manufacture and to assemble.

It is a further object of the present invention to provide a shutter mechanism for use in a single-use camera which only exposes a single image.

It is yet another object of the present invention to provide a shutter mechanism which is very thin and occupies little space. Such a shutter mechanism may be useful in any type of camera.

In accordance with one aspect of the present invention, there is provided a shutter mechanism for a camera, the mechanism comprising:

support means;

activation means mounted on the support means;

shutter means connected to the activation means and mounted for movement relative to the support means, the shutter means being movable between a first position and a second position to allow light into the camera;

characterised in that the activation means comprise a bi-stable trigger which, when activated, moves linearly between a first stable state and a second stable state to drive the shutter means from its first position to its second position.

In a preferred embodiment, the bi-stable trigger and the shutter means are integral such that the shutter means moves linearly following activation of the trigger. Alternatively, the shutter means may move in an arc following activation of the trigger.

The shutter means may be pivotally attached to the trigger. If this is the case, a link may join the shutter means to the trigger, which link pivots during use about a region between the shutter means and the trigger. The activation means preferably comprise spring means mounted on the support means which urge the trigger into the first and second stable states. Further, pivot arms may act between the spring means and the trigger.

Preferably the activation means are formed from plastics material, preferably polypropylene. Any other appropriate material may, of course, alternatively be used. Indeed, the activation means could be formed from metal for certain applications.

In a preferred embodiment, the activation means and the shutter means are integrally formed. Furthermore, the activation means and the shutter means preferably lie in substantially the same plane, and are preferably substantially planar.

Preferably the bi-stable trigger can be moved back to its first stable state from its second stable state to reset the shutter mechanism. If this is the case, means for re-setting the shutter mechanism may comprise a push button which acts linearly against the bi-stable trigger. Further, the push button may be spring-biased away from the bi-stable trigger, so that the button only acts on the trigger when the trigger is to be re-set. During resetting a finger is caused to overlie the exposing aperture so that no exposure occurs during this resetting.

A stop may be provided to prevent over activation of the trigger. Such a stop may be a simple abutment formed on the support means.

According to a second aspect of the present invention, there is provided a shutter mechanism for a camera, the mechanism comprising:

a shutter blade;

spring means for driving the shutter blade; and a trigger for activating the spring means;

characterised in that the shutter blade, the spring means and the trigger are all formed integrally. If this is the case, the shutter blade, spring means and trigger may be formed integrally from plastics material, possibly by moulding. Alternatively, a sheet of plastics material may simply be stamped to define the component parts of the shutter mechanism. As a result, an extremely simple and inexpensive, yet efficient and reliable, shutter mechanism is provided.

In accordance with another aspect of the present invention, there is provided a shutter mechanism for a camera, the mechanism comprising:

support means;

spring means mounted on the support means;

shutter means connected to the spring means and mounted for movement relative to the support means, the shutter means being movable between a first position and a second position to allow light into the camera;

characterized in that the shutter means is connected to the spring means by pivot means which allow the shutter means to accelerate as it moves from its first to its second position.

It is preferred that the spring means, shutter means and pivot means all lie in substantially the same plane on the support means.

Advantageously, the spring means, shutter means and pivot means are integrally formed.

Preferably, the spring means, shutter means and pivot means are substantially planar.

Advantageous Effect of the Invention

By this arrangement, a simple, inexpensive shutter mechanism is provided which can easily be incorporated into a single-use camera or any other suitable camera.

Moreover, the shutter mechanism in accordance with the present invention can be manufactured in a single piece.

BRIEF DESCRIPTION OF THE DRAWINGS

For a better understanding of the present invention, reference will now be made, by way of example only, to the accompanying drawings in which.

DETAILED DESCRIPTION OF THE INVENTION

The present invention particularly relates to a shutter mechanism for use in a single-shot camera. However, it will be appreciated that a shutter mechanism according to the present invention may also be used in other types of cameras, for example, single-use cameras.

Figure 1:
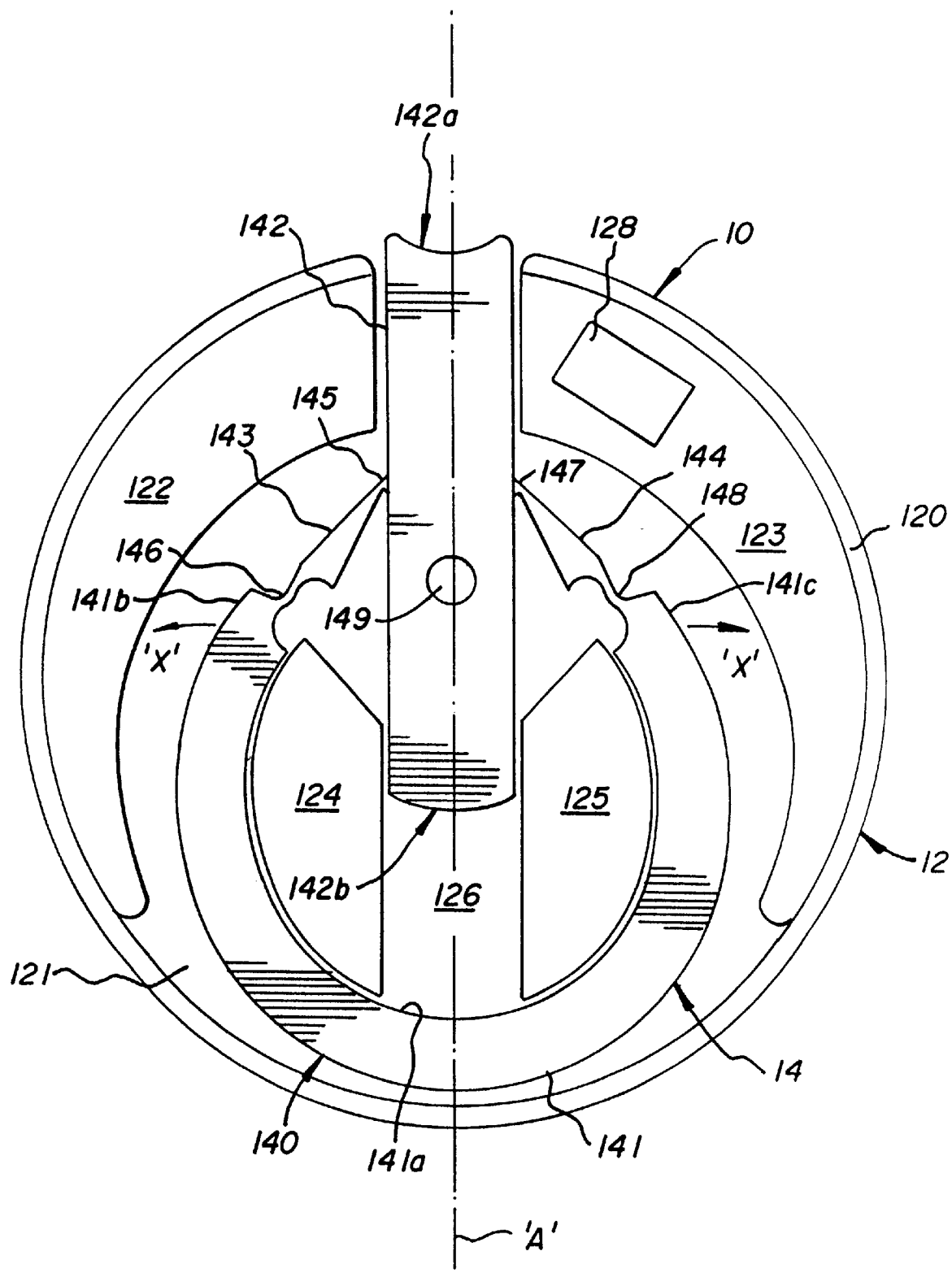
FIG. 1 is a schematic illustration of a shutter mechanism in accordance with the present invention, shown in its 'set' position, prior to being deployed.
Figure 2:
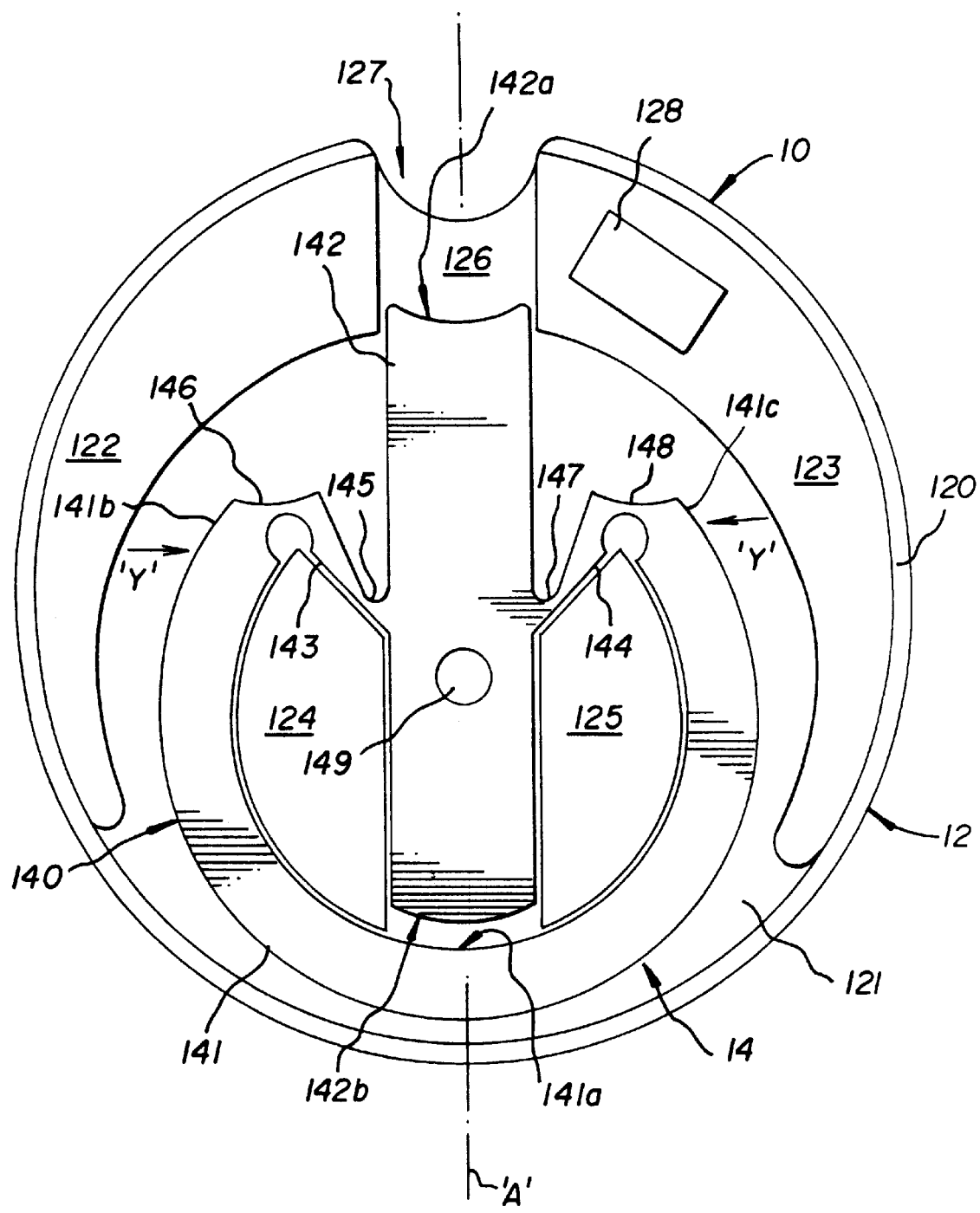
FIG. 2 is a similar to FIG. 1 but shows the shutter mechanism in its deployed position.

FIGS. 1 and 2 show a shutter mechanism 10 in accordance with the present invention. The mechanism 10 comprises a mounting plate 12 which provides support for a shutter member 14.

Mounting plate 12 comprises a substantially circular disc 120 having a recess portion 121. The recess portion 121 is defined by a raised wall portions 122, 123 and raised segments 124, 125. Wall portions 122, 123 and segments 124, 125 define an elongate slot 126 which forms a part of recess portion 121.

Mounting plate 12 also houses a camera lens (not shown) along slot 126 and shutter member 14 is positioned so that it covers the lens until the shutter mechanism is activated or deployed. A viewfinder 128, comprising a further lens (not shown) or merely a view-hole, is provided in raised wall portion 123 of disc 120.

Shutter member 14 comprises an integrally formed component 140 which has a generally C-shaped spring member 141, an elongated shutter blade/trigger member 142, arm portions 143, 144 and pivot or hinge portions 145, 146, 147, 148. Arm portions 143, 144 are connected to spring member 141 by hinge portions 146, 148 and to shutter blade/trigger member 142 by hinge portions 145, 147. An aperture 149 is provided in shutter blade/trigger member 142 for allowing light to enter the camera lens (not shown) as the shutter mechanism 10 is deployed to expose the photographic material housed in the camera (also not shown) of which the shutter mechanism 10 forms a part.

Ideally, component 140 is injection-moulded as a single piece from polypropylene and hinge portions 143, 144, 145, 146 comprise 'living' hinges. However, it will be readily appreciated that component 140 may be stamped out of a piece of material or manufactured using any other suitable technique. Moreover, materials other than polypropylene may also be used.

As shown in FIG. 1, in the 'set' position, shutter member 14 is located in recess portion 121 of mounting plate 12 with the shutter blade/trigger member 142 of shutter member 14 lying in elongate slot 126. Shutter blade/trigger member 142 is retained, in the position shown, by the action of spring member 141, arm portions 143, 144 and hinge portions 145, 146, 147, 148.

When the shutter blade/trigger member 142 is deployed by pressing on end 142a thereof, member 142 initially moves downwards causing hinges 145, 147 to bend or flex and to rotate arm portions 143, 144 about hinge portions 146, 148. This causes upper ends 141b, 141c of spring member 141 to flex outwards in the direction indicated by arrows 'X'. Further pressure on end 142a causes arm portions 143, 144 to continue to move about hinge portions 146, 148 until arm portions 143, 144 pass through a position where upper ends 141b, 141c of spring member 141 are at their furthest point away from an axis 'A' passing through the shutter mechanism 10 as shown. Once this furthest point has been reached, the tension in the spring member 141 causes upper ends 141b, 141c to move back towards their rest position, (as shown in FIG. 1), in the directions indicated by arrows 'Y' in FIG. 2, forcing shutter blade/trigger member 142 to accelerate over the lens (not shown). This acceleration is achieved because the shutter member 14 has a metastable position through which it is moved as shutter blade/trigger member 142 is deployed towards spring member 141 within the recess 121. This allows end 142b of the shutter blade/trigger member 142 to move towards central portion 141a of spring member 141, as shown in FIG. 2.

It will be appreciated that the acceleration of the shutter blade/trigger member 142 is chosen to produce the desired shutter speed and to control the amount of light entering the camera and falling on the photographic material. This is achieved by aperture 149 passing over the camera lens (not shown) mounted in the mounting plate 12.

In the embodiment described, the shutter mechanism 10 has a fixed predetermined shutter speed. This is related to the spring used. It is envisaged that other spring arrangements can be used in which adjustment may be provided so that the shutter speed can be varied.

In the position shown in FIG. 2, the shutter blade/trigger member 142 is locked in position and can only be moved back to its 'set' position, FIG. 1, once the shutter mechanism 10 has been dismantled. This is the case when the shutter mechanism of the present invention is used in a single-shot camera.

Although the present invention has been described as a single operation shutter mechanism, it will be readily appreciated that a suitable arrangement can be provided for moving the shutter blade/trigger member 142 back to its 'set' position (FIG. 1) from its deployed position (FIG. 2).

Such an arrangement is described hereinafter with references to FIGS. 5 and 6 of the drawings.

Moreover, it will be readily appreciated that other suitable arm/spring/hinge arrangements may be utilised provided these arrangements have a metastable position through which the shutter blade is moved to impart the acceleration for producing a desired shutter speed as it is moved from its 'set' position to its deployed position.

Additionally, a stop may be provided to prevent an operator pushing the shutter blade/trigger member further than just past the metastable position. In the described embodiment, a cut-out portion 127 is provided in disc 120 (FIG. 2) which acts as a stop. Naturally, other means may be used to effect a stop.

It will be readily appreciated that the lens may not be mounted in the mounting plate and may be mounted in another plate located adjacent the shutter mechanism 10.

Moreover, the shutter mechanism need not be in front of the lens as it can also be located behind the lens without detracting from the present invention. Furthermore, the shutter mechanism can be mounted between two lenses in a multi-lens arrangement.

Although in the described embodiment, arm portions 143, 144 are connected to the spring member 141, the arm portions may also comprise the springs required for operation of the mechanism.

It will be evident that although it is preferred to have the shutter member made as a single component, it may comprise a plurality of individual components which are suitably connected together to provide the shutter mechanism.

Figure 3:
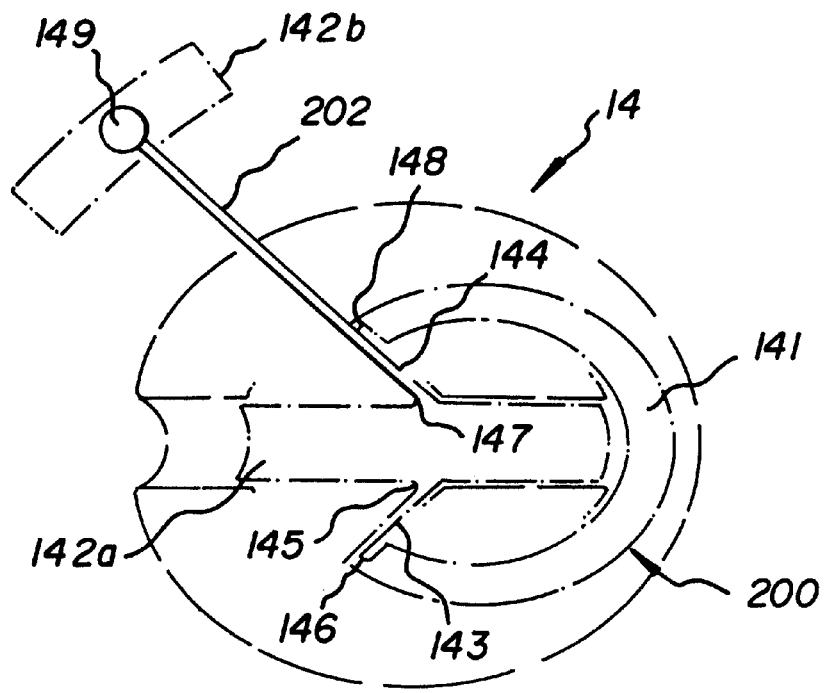
FIG. 3 shows a second embodiment of shutter mechanism according to the present invention.
Figure 4:
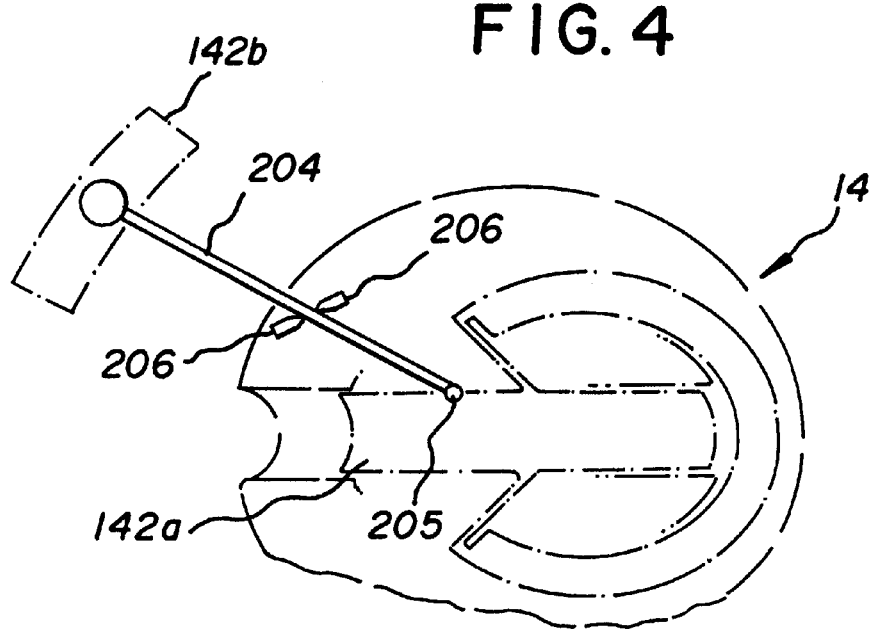
FIG. 4 shows a third embodiment of shutter mechanism according to the present invention.

Turning now to alternative specific embodiments of the present invention, FIGS. 3 and 4 each show schematically a shutter member 14 on a mounting plate 12. In these embodiments, however, the lens of the camera (not shown) lies outside the C-shaped spring member 141.

In the second embodiment shown in FIG. 3, the generally C-shaped spring member 141, elongated trigger member 142a, arm portions 143, 144 and hinge portions 145,146, 147,148 form a bi-stable activation means 200 for driving the shutter blade 142b between its first and its second positions.

In the FIG. 3 embodiment, the shutter blade 142b with aperture 149 is carried by an arm 202 which extends from arm portion 144 of activation means 200. As a result, as the trigger member 142a is activated (or deployed) and moves from its first stable state to its second stable state past its metastable position, the shutter blade 142b swings about an arc centred on hinge portion 148. Accordingly, the aperture 149 passes over the lens of the camera to allow light to enter the camera for the required period of time.

With reference to the third embodiment shown in FIG. 4 of the drawings, the shutter blade 142b is carried by link 204 which is pivotally mounted at a point 205 along the trigger member 142a. Abutments 206 are arranged on either side of the link 204 such that, as the trigger member 142a is activated, the link 204 pivots about point 205 and the abutments 206 such that the shutter blade 142b and aperture 149 pivot about the abutments 206. In this way, the aperture 149 passes the camera lens to enable light to enter the camera.

It will be appreciated that, by adjusting the length of the arm 202 shown in FIG. 3 or the link 204 shown in FIG. 4, the amount of travel made by the shutter blade 142b during activation of the trigger member 142a can be varied. Thus, the expsoure time of the shutter, and hence the amount of light entering the camera, can be adjusted as required.

Figure 5:
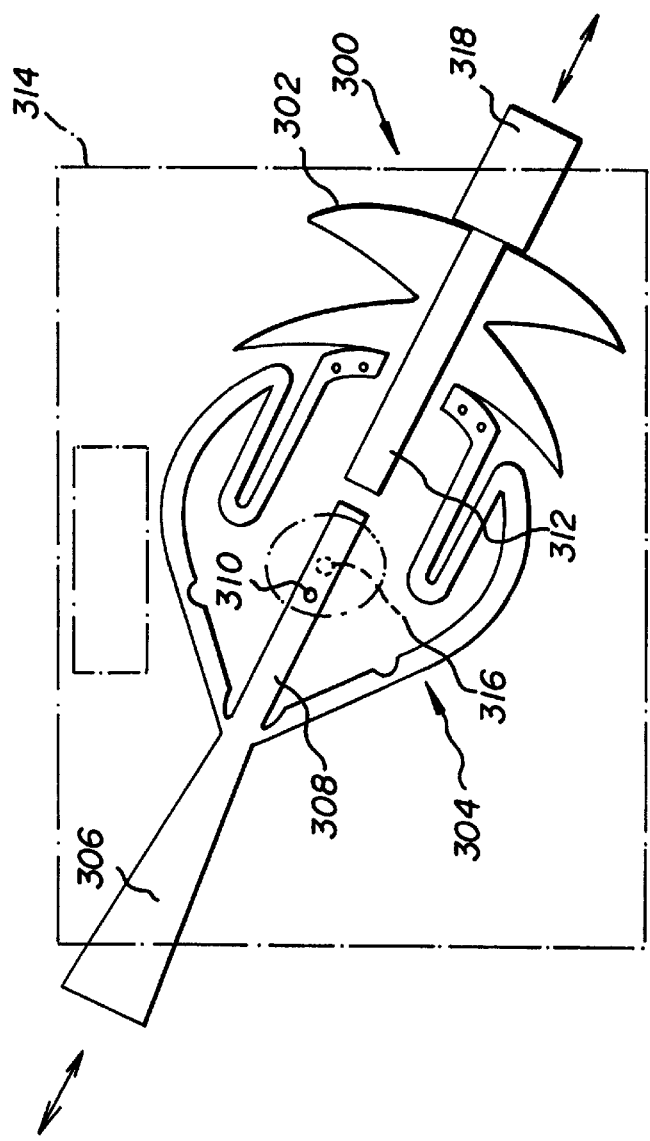
FIG. 5 shows an embodiment of shutter mechanism according to the present invention with a re-set device.
Figure 6:
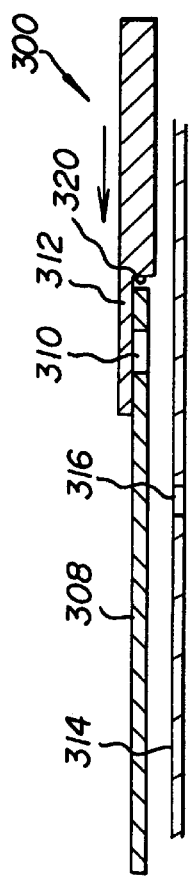
FIG. 6 is a partial side view of the shutter mechanism during re-setting of the mechanism.

Turning now to FIGS. 5 and 6 of the drawings, a reset device 300 is shown biased by means of a spring 302 away from a shutter mechanism 304 of the kind described herein with reference to FIGS. 1 and 2 of the drawings. When the bi-stable trigger 306 is activated, the shutter blade 308 is biased into its second stable position shown in FIG. 6, with the aperture 310 positioned between a finger 312 of the re-setting device 300 and a portion of the camera body 314 which carries the camera aperture 316.

During re-setting of the shutter mechanism 304, a reset button 318 of the re-setting device 300 is pushed against the spring 302 such that a shoulder 320 bears against the end of the shutter blade 308. As a result, further depression of the re-set button 318 causes the shutter blade 308 to be moved back past the metastable state of the shutter mechanism 304 until the first stable state is once again reached. Upon release of the re-set button 318, the re-set device 300 returns to its original position as shown in FIG. 5 of the drawings.

As will be appreciated, the finger 312 of the re-set button 318 overlies the aperture 310 of the shutter blade 308 such that light cannot enter the camera during resetting of the shutter mechanism 304. However, upon re-activation of the shutter mechanism 304, normal operation of the shutter mechanism occurs because the finger 312 of the re-setting device 300 has been removed from the aperture 310 of the shutter blade 308 due to the action of the spring 302.

Although one form of re-setting device 300 has been described herein, many other forms will occur to those skilled in the relevant art.

It will of course be understood that the present invention has been described above purely by way of example, and that modifications of detail can be made within the scope of the invention.

We claim:

1. A shutter mechanism for a camera, the mechanism comprising:

support means;

activation means mounted on the support means;

shutter means connected to the activation means and mounted for movement relative to the support means, the shutter means being movable between a first position and a second position to allow light into the camera;

wherein the activation means further comprises a bi-stable trigger which, when activated, moves linearly between a first stable state and a second stable state, via a metastable state through which it accelerates, to drive the shutter means from its first position to its second position.

2. A mechanism according to claim 1, wherein the bi-stable trigger and the shutter means are integral such that the shutter means moves linearly following activation of the trigger.

3. A mechanism according to claim 1, wherein the shutter means moves in an arc following activation of the trigger.

4. A mechanism according to claim 3, wherein the shutter means is pivotally attached to the trigger.

5. A mechanism according to claim 4, wherein a link joins the shutter means to the trigger and pivots during use about a region between the shutter means and the trigger.

6. A mechanism according to claim 1, wherein the activation means further comprises spring means mounted on the support means which urge the bi-stable trigger into the first and second stable states.

7. A mechanism according to claim 6, wherein pivot arms act between the spring means and the trigger.

8. A mechanism according to claim 1, wherein the activation means comprises plastic material.

9. A mechanism according to claim 8, wherein the plastics material is polypropylene.

10. A mechanism according to claim 1, wherein the activation means and the shutter means are integral.

11. A mechanism according to claim 1, wherein the activation means and the shutter means are substantially planar.

12. A mechanism according to claim 1, wherein the trigger can be moved back to its first stable state from its second stable state to re-set the shutter mechanism.

13. A mechanism according to claim 1, further comprising a stop disposed to prevent over activation of the trigger.

14. A shutter mechanism for a camera, the mechanism comprising:

a shutter blade;

spring means for driving the shutter blade; and a trigger for activating the spring means;

wherein the shutter blade, the spring means and the trigger are of one-piece construction.

15. A shutter mechanism for a camera, the mechanism comprising:

support means;

spring means mounted on the support means;

shutter means connected to the spring means and mounted for movement relative to the support means, the shutter means being movable between a first position and a second position to allow light into the camera;

pivot means which allows the shutter means to accelerate through a metastable state as it moves from its first to its second position:

wherein the shutter means is connected to the spring means by said pivot means;

wherein the spring means, shutter means and pivot means are of one-piece construction.

16. A mechanism according to claim 15 wherein the spring means, shutter means and pivot means are substantially planar.

17. A shutter mechanism comprising: a mounting plate defining a slot; and a shutter member including a shutter blade, a pair of arm portions, and a spring member, said shutter blade being disposed within said slot, said shutter blade having an aperture, said shutter blade being movable along said slot from a pre-exposure position to an exposure position, and from said exposure position to a post-exposure position, each said arm portion having a first end pivotably connected to said shutter blade and a second, opposed end pivotably connected to said spring member, said spring member resiliently biasing said shutter blade toward said pre-exposure position when said shutter blade is between said pre-exposure position and said exposure position, said spring member resiliently biasing said shutter blade toward said post-exposure position when said shutter blade is between said exposure position and said post-exposure position.

18. A mechanism according to claim 17, wherein said shutter member is substantially planar, said mounting plate is substantially planar, and said shutter member is substantially coplanar with said slot.

19. A mechanism according to claim 17, wherein said shutter member further comprises a trigger member joined to said shutter blade, and said mechanism further comprises a stop, said trigger member being disposed for manual activation, said stop being disposed to prevent over activation of the trigger member.

20. A shutter mechanism for a camera, the mechanism comprising:

support means;

activation means mounted on the support means;

shutter means connected to the activation means and mounted for movement relative to the support means, the shutter means being movable between a first position and a second position to allow light into the camera;

wherein the activation means further comprises a bi-stable trigger which, when activated, moves linearly between a first stable state and a second stable state to drive the shutter means from a first position to a second position, and a push button which acts linearly against the bi-stable trigger to move said trigger back to said first stable state from said second stable state and thereby re-set the shutter mechanism.

21. A mechanism according to claim 20 wherein the push button is spring biased away from the bi-stable trigger.

* * * * *